Dec. 27, 1932.  S. I. BOUSMAN  1,892,648

SEDIMENTATION DEVICE

Filed July 23, 1932  3 Sheets-Sheet 1

Inventor
SAMUEL I. BOUSMAN
By
Arthur Middleton
Attorney

Dec. 27, 1932.  S. I. BOUSMAN  1,892,648
SEDIMENTATION DEVICE
Filed July 23, 1932   3 Sheets-Sheet 2
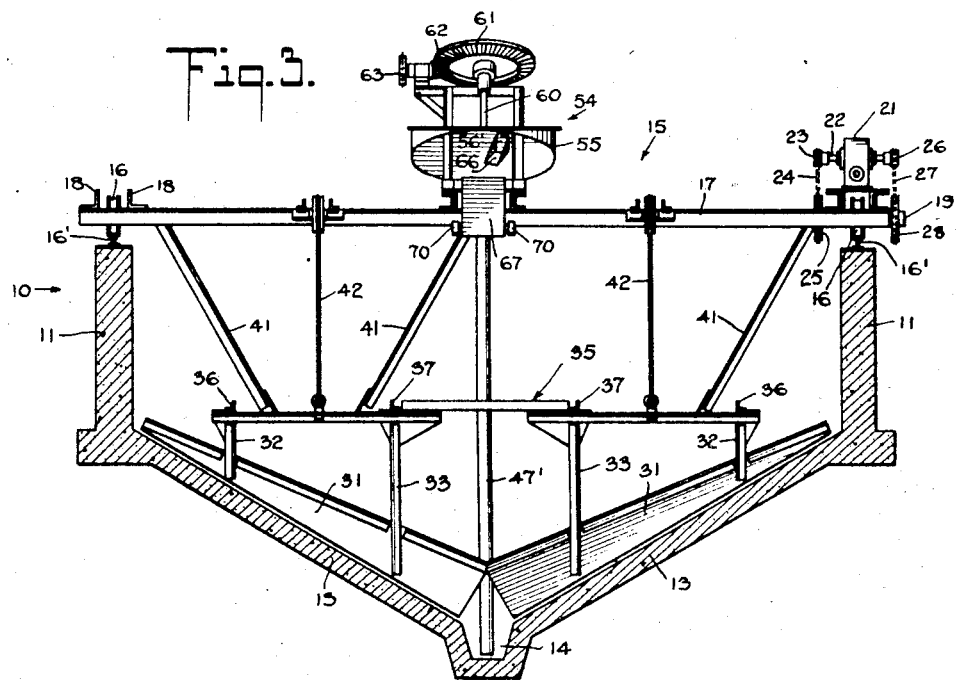
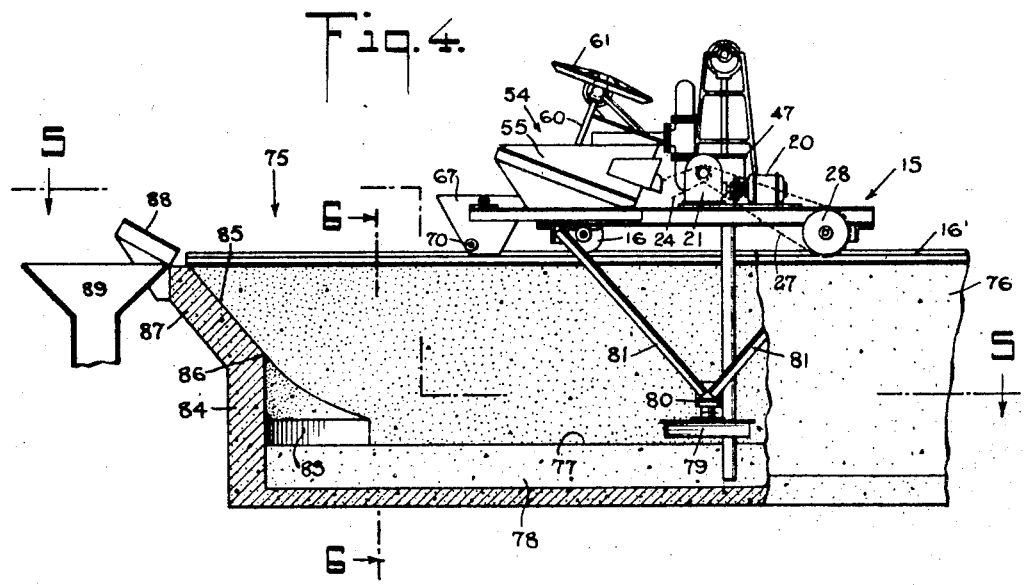
Inventor
SAMUEL I. BOUSMAN
By
Arthur Middleton
Attorney

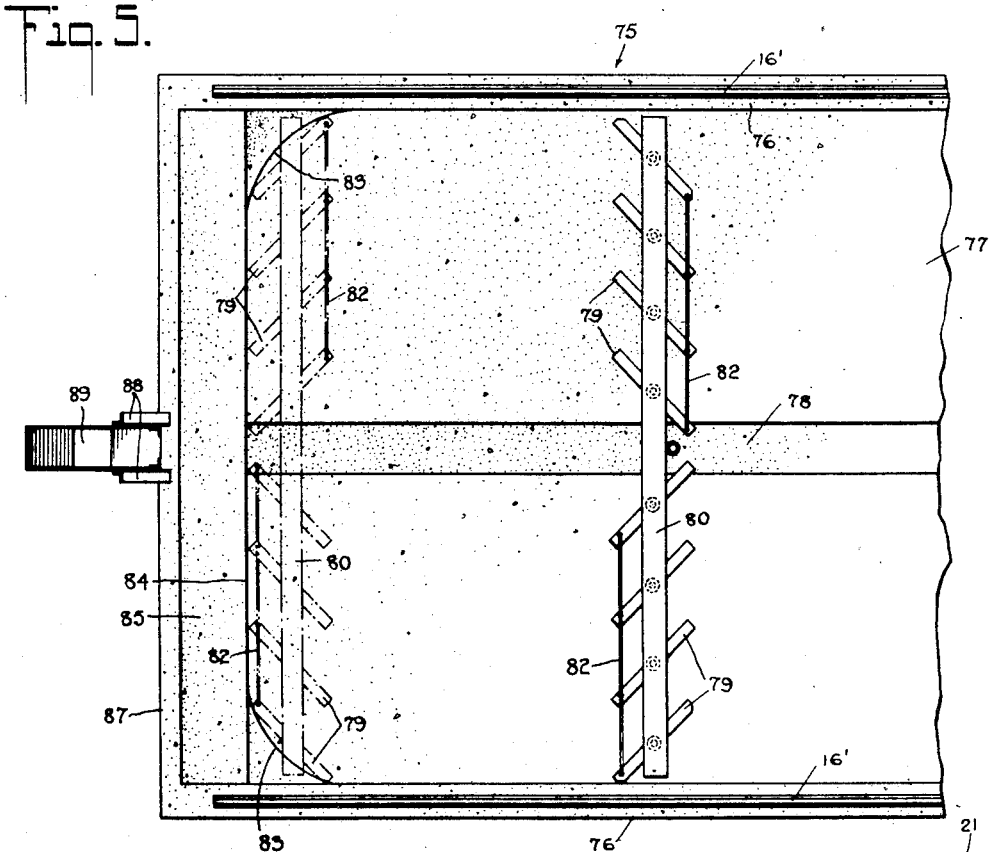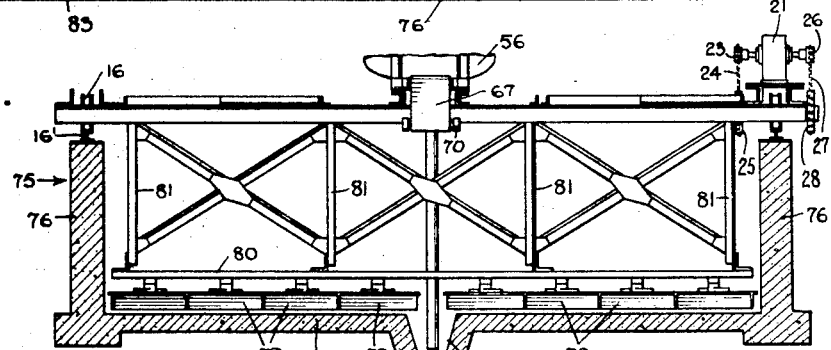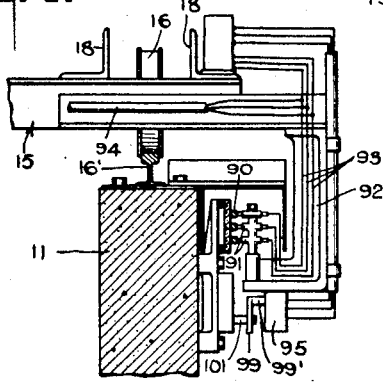

Patented Dec. 27, 1932

1,892,648

UNITED STATES PATENT OFFICE

SAMUEL I. BOUSMAN, OF DENVER, COLORADO, ASSIGNOR TO THE DORR COMPANY, INC., OF NEW YORK, N. Y., A CORPORATION OF DELAWARE

SEDIMENTATION DEVICE

Original application filed June 1, 1929, Serial No. 367,783. Divided and this application filed July 23, 1932. Serial No. 624,317.

This invention relates to means for the mechanical collection and removal of settled solids from rectangular compartments and is particularly directed to a traveling mechanism adapted to collect and remove the sludge or grit from the usual type of elongated sedimentation chamber through which sewage or other solids bearing liquid is passed for sedimentation or clarifying treatment.

In sewage disposal plants, for instance, it is necessary to remove from the incoming sewage the grit or sludge found therein, particularly during storm flows, as such grit is not only harmful to the treatment apparatus such as screens but is objectionable in the treatment processes which operate solely upon the organic matter. It is therefore the general practice to provide a plurality of elongated settling compartments or grit chambers through which the sewage passes; and as the grit has a much higher settling rate than the remaining constituents of the sewage, a rate of flow can be provided which permits the grit to settle out while the organic matter remains in suspension.

In removing the grit from these chambers it is the present practice to block off the ends of one chamber, pump out the sewage therein, and remove the grit by grab buckets or the like. This arrangement not only is clumsy and objectionable because the operation of such buckets takes up considerable space and they inevitably spill a portion of the material, but furthermore an unnecessarily large proportion of organic material is included with the grit, since such material necessarily settles out when the compartment is blocked off. The arrangement likewise requires the provision of an excessive number of grit chambers, since the capacity must be ample when one of such chambers is out of operation.

The principal object of this invention is to provide mechanism suitable for use in grit or other sedimentation chambers of the standard elongated type which will collect the grit or settled sludge continuously or semi-continuously as desired without interrupting the flow through the chamber. A further object is to provide mechanism of this type which is relatively compact and free from projecting or unsightly parts, and which is neat and sightly in operation. These objects are in general accomplished by employing a traveling carriage preferably reciprocating along the grit or sedimentation chamber and provided with means for moving the grit or settled sludge laterally into the path of a removal device, which preferably is likewise mounted on the carriage. A further object is to provide mechanism of this type which is automatically reversible at the ends of the chamber so that it not only will reverse the motion of the carriage but will reverse the operation of the rakes so that the grit or settled sludge is shifted into the same path regardless of the direction in which the carriage is traveling.

It is frequently desirable to use the grit from sewage as fill either adjacent to the sewage plant or at some location near human habitations. If this is desired it is highly objectionable to have a large percentage of organic matter included in the grit, owing to the objectionable odors arising from such grit. A further object of the invention therefore is to provide a grit collecting mechanism which includes means for removing from the grit a substantial portion of the organic matter entrapped therewith so as to permit the use of the grit as fill near habitations.

One feature relates specifically to means for withdrawing the grit or sedimented solids and provides a longitudinal sump in the bottom of the chamber, which extends below the zone of rake action. The grit or settled solids by sedimentation form a layer upon the bottom of the chamber from whence they are raked into the sump. In the sump they are concentrated into a body of appreciable depth of a thickened mixture or sludge of gritty bearing material and liquid. A suction nozzle sufficiently immersed into the sump moves therealong and withdraws the mixture from the sump which may or may not be submitted to subsequent treatment such as to clean.

According to another feature the cleaning step is performed in a separate chamber in which combined agitation and decantation effects the separation of a clean grit from the residual liquid and deleterious matter suspended therein.

Other objects and advantages will be apparent upon consideration of the following description and of the drawings, in which:

Fig. 3 is an end elevation of the apparatus in Fig. 1 taken along the line 3—3, the grit or sedimentation chamber being shown in section along said line;

Fig. 4 is a view similar to Fig. 2 but of a modified form of apparatus;

Fig. 5 is a view of the apparatus shown in Fig. 4, taken along the line 5—5 of Fig. 4 and looking in the direction of the arrows;

Fig. 6 is a view similar to Fig. 3 taken along the line 6—6 of Fig. 4; and

Fig. 7 is a fragmentary end view illustrating means for controlling the motor for driving the carriage and the apparatus thereon.

Figure 1:
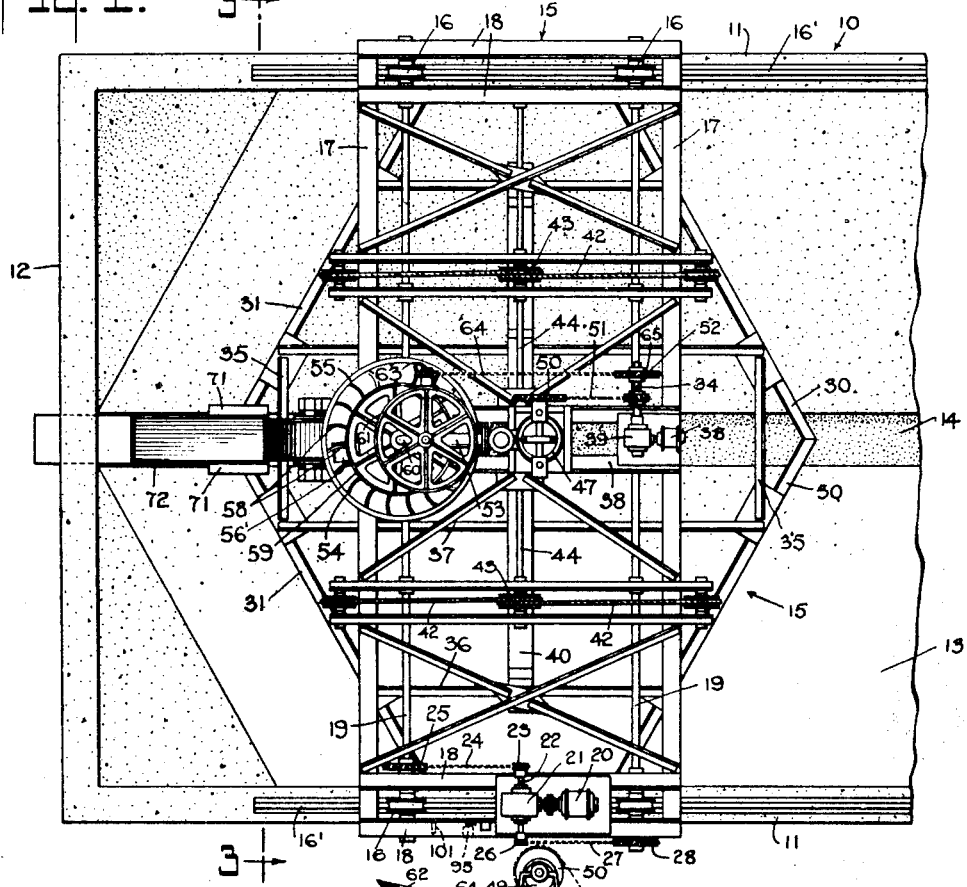
Fig. 1 is a plan view illustrating one embodiment of the invention.
Figure 2:
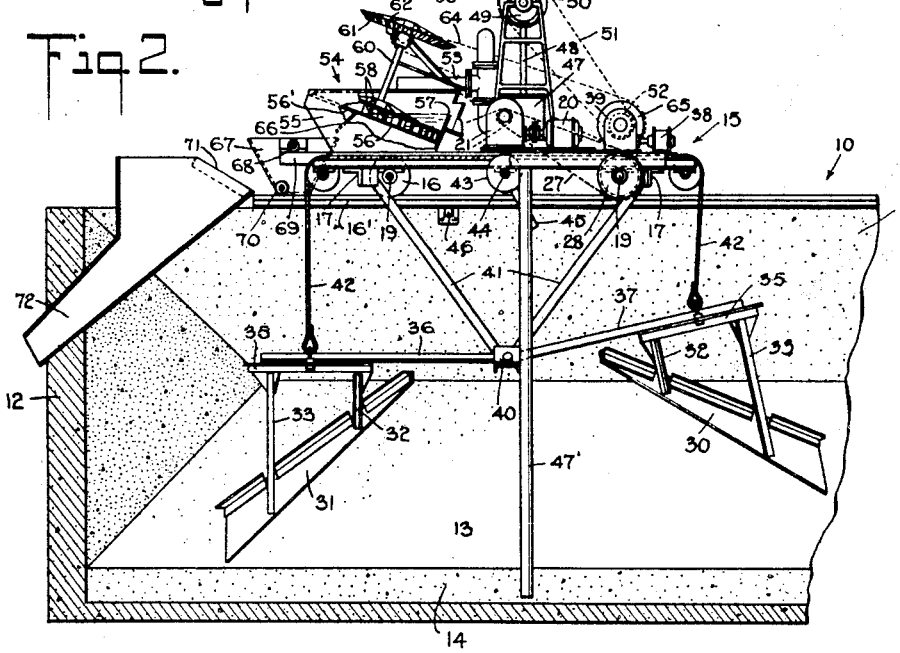
Fig. 2 is a side elevation of the apparatus shown in Fig. 1, partially broken away to show the underlying structure.

As already indicated, the objects of the invention may be carried out by providing a carriage traveling along the grit or sedimentation chamber and carrying scraping or sweeping means for propelling accumulated grit and other settled solids to a collection zone extending longitudinally of the chamber. In the preferred form the carriage also includes means for removing the accumulated grit from said zone; and for this purpose it is proposed to employ a suction pump and lift piping connecting therewith, as it has been found that this arrangement when used in conjunction with operating scrapers of the type indicated is practicable for lifting the grit. The carriage may likewise carry a suitable grit cleaning device operative to remove foreign matter such as organics from the grit and preferably to return such removed material directly to the liquid in the grit chamber while the clean grit is suitably discharged as by depositing same in a hopper at an end or side of the chamber.

Referring to the drawings, 10 indicates a grit chamber having side walls 11, end walls 12 at one of which the cleaned grit is discharged, and a bottom 13 which may be inclined downwardly from each side wall toward a longitudinal collection zone, such as central channel or sump 14.

The apparatus for moving the accumulated grit or settled sludge into the collection zone and removing it therefrom is mounted on a carriage 15 extending across the grit chamber and provided at opposite sides of the grit chamber with wheels 16 resting on rails 16' extending along the tops of the side walls 11 of the grit chamber. The carriage 15 includes longitudinal beams or members 17 extending across the tank, a pair of cross members or beams 18 at each end of the carriage over the side walls of the grit chamber, with suitable connecting and supporting structure. At each end of the carriage there are two wheels 16, and such wheels are fixed on two shafts 19 rotatable in bearings secured to the cross members 18. As shown in Fig. 1, a motor 20 is mounted upon the two members 18 at one end of the carriage and is connected through a speed reducer 21 with a shaft 22 having at one end a sprocket wheel 23 connected by a sprocket chain 24 with a sprocket wheel 25 mounted on one of said shafts 19, and having at the other end a sprocket wheel 26 connected by means of a sprocket chain 27 with a sprocket wheel 28 mounted on the other shaft 19. It will be evident that by proper control of the motor 20, the carriage may be caused to travel in either direction along the grit chamber.

A scraper mechanism is provided for conveying accumulated grit or settled sludge toward the collection zone or channel, preferably during both directions of movement of the carriage. This scraper mechanism may include a pair of scraper blades or rakes 30 for moving the grit into the channel during movement of the carriage toward the discharge end of the grit chamber, such blades converging rearwardly, or away from the discharge end of the chamber and being positioned with their lower edges substantially parallel to the portions of the floor beneath the same; and two blades 31 similarly arranged except that they converge in the opposite direction. The scraper sections or blades 30 and 31 are connected in any suitable manner, as by means of short arms 32 and longer arms 33, with frames 35 at the opposite ends of members 36 and 37, which are pivotally connected with a member 40 extending longitudinally of the carriage and suspended therefrom by means including struts 41.

The pivotal connection between members 36 and 37 and the cross member 40 is such that the scraper sections 30 and 31 may be raised and lowered alternately. Such alternate raising and lowering of the two sets of scraper sections or blades may be effected by suitable means including cables 42 extending around sheaves 43 on a shaft 44 and connected at their ends with the frames 35 to which the two sets of blades 30 and 31 are attached. For the purpose of controlling the position of the shaft 44, there is mounted thereon an arm 45 which, as the carriage approaches either end of its path, strikes a stop or abutment 46 and is shifted to turn the shaft and thereby raise one set of blades to ineffective position and lower the other set to effective position.

The grit accumulated in the channel or sump 14 is removed therefrom by suitable means such as pump 47 through a suction line or pipe 47' depending from the carriage and with its lower end in said channel 14. The piston rod or plunger 48 of the pump is actuated by means of an eccentric 49 driven by a sprocket wheel 50 connected by means of a sprocket chain 51 with a sprocket wheel 52 on jack shaft 34 driven through speed reducer 39 by motor 38. From the pump 47, the grit and other material discharged therewith passes through a discharge line or pipe 53 into a suitable cleaning device or washer 54.

As illustrated, the washer 54 includes an inclined circular tank 55 having a correspondingly inclined bottom 56 and the level of the liquid in said tank is controlled by the overflow lip 57, the upper part of the inclined bottom serving as a drainage deck and being provided with an outlet or opening 56'. The grit settling in the washer tank is carried up the inclined bottom or deck by buckets or paddles 58, arranged around the circumference of a wheel 59 turning in a plane parallel to the inclined bottom of the washer. The wheel 59 is driven by a shaft 60 carrying at its top a large bevel gear 61 meshing with a small bevel gear 62 which is driven by a sprocket wheel 63 connected by means of a sprocket chain 64 with a sprocket wheel 65 on jack shaft 34.

The grit cleaned by the washer 54 passes downwardly through the opening 56' in the drainage deck of the cleaner and is directed by a downwardly inclined member 66 into a hopper 67 underslung on pivots 68 on the ends of two cross members 69 on the carriage 15. When the carriage approaches the proper end of its path, rollers 70 on the hopper 67 engage inclined members 71 at opposide sides of a chute 72 supported at the discharge end of the grit chamber, and the hopper is tilted and emptied into said chute. Upon movement of the carriage away from the chute, the hopper 67 will swing back to its normal position to receive grit discharged from the washer.

Each end wall 12 of the grit chamber is so constructed at its inner face that grit settling at the ends of the chamber will be reached by the scraper blades, thus avoiding any dead spaces in which the grit would remain indefinitely. Preferably the desired effect is obtained by constructing each wall 12 so that its inner face is made up of two parts which join the bottom of the tank along lines having substantially the same angle there between as the lower edges of the adjacent set of blades. The inner surfaces of the ends 12 may vary in shape but all parts thereof should be vertical or so inclined that the grit will, in settling, be directed thereby to the bottom of the chamber.

In the modified form of apparatus shown in Figs. 4, 5 and 6, there is a grit chamber or tank 75 having side walls 76 and a bottom 77 which is substantially flat except for a central longitudinal channel 78 into which the grit is swept or scraped and from which the grit is removed for discharge from the grit chamber. In this form of apparatus the carriage is driven and the pump and washer are operated in substantially the same manner as in the first form of the apparatus heretofore described. It will be evident that scraper devices of the same general form disclosed in connection with the first embodiment of the invention might be used in connection with the flat bottom of tank 75. However, in the second form of apparatus there are provided a plurality of scraper units or blades 79 pivotally mounted at the lower side of a member 80, said member 80 being preferably framelike and rigidly supported from the carriage by suitable means including struts 81. As shown in Fig. 5, the scraper units 79 on each side of the channel 78 are connected by links 82 so that upon reversal of position of any one of these scraper units the entire group will be shifted. For the purpose of shifting the two groups of scrapers or rakes the tank 75 is provided at its ends with curved surfaces or cams 83 which, when engaged by the outside scraper units 79 act to shift said members from their full line positions (Fig. 5) to their dot and dash positions in the same figure. Then, when the carriage is reversed, the scraper units will be in position to scrape the grit along the bottom of the chamber and transfer it to the central channel during movement of the carriage in such reverse direction.

Inasmuch as the scraper units or blades 79 should act equally at both ends of the grit chamber, said member 80 is preferably positioned beneath the middle of the carriage; and the ends 84 of the grit chamber should be constructed in a suitable manner to eliminate any dead space in which grit will remain more or less permanently. Preferably, this result is attained by forming each of the ends with an inner face having a portion 85 so inclined as to accommodate the struts 81 and the other structure suspended from the carriage and also to cause the grit settling thereon to slide into the zone of scraper action. In the preferred form of construction for this form of scraper mechanism the grit chamber may be provided at each end with a suitable overhang 87. Also there are at one end of the grit chamber inclined or cam surfaces 88 to cooperate with the rollers 70 on the hopper 67 and dump the contents of the latter into a chute 89 outside of the chamber or tank 75.

The motors 20 and 38 may conveniently be of a type for use with three-phase alternating current supplied thereto from three bus bars 90 through brushes 91 mounted on a bracket 92 depending from the frame of the carriage 15. From these brushes power lines 93 pass upwardly through a tube or conduit 94 and are connected with said motors. In order to reciprocate the carriage the motor 20 is reversed as the carriage comes to the end of its path in each direction of movement and this reversal is effected by any suitable means such as a reversing switch 95 in the connection between the power lines and the motor 20, and a distant control device 96 connected with the reversing switch 95 by control lines 97 passing through a tube or conduit 98.

The control device is operated by any suitable means, such as an arm 99 mounted on a shaft 99' of the control device, and, in order to operate the arm 99 automatically, the control device is mounted on a bracket 100 extending downwardly from the carriage, so that the arm will engage and be shifted by suitable projections or pins 101 at the outer surface of the adjacent side wall of the tank and so located as to be engaged as the carriage approaches the ends of its path. No stopping switches are shown, but it will be understood that stopping and starting of the motors may be effected in any suitable manner, as for example, by providing separate switches for the two motors or by providing a switch for controlling the supply of current to the bus bars.

Although no mention has been made of either an inlet or an outlet for either of the illustrated forms of grit chamber, it should be understood that the influent material of solids bearing liquid such as sewage may, for example, be introduced at any convenient point at one end of each chamber and the effluent material discharged at the other end. The apparatus of the present invention is particularly adapted for use in the treatment of sewage but may also be used for other classes of work, such as water purification, for instance.

While the preferred forms shown have disclosed a definite trough or channel running along the approximate center of the chamber, it will be readily understood that the invention is not limited either to the use of a depression for the grit nor to the central location of the collection zone, since such zone can conveniently be located along any line between the sides of the tank by obvious changes in design of the apparatus.

It should also be understood that various changes may be made in the construction and arrangement of parts and that certain parts may be used without others without departing from the true scope and spirit of the invention.

This application is a division of my copending application 367,783, filed June 1, 1929.

Having thus described my invention, I claim:

1. In a sedimentation system including a grit chamber, the combination of means travelling longitudinally of said chamber for collecting in a longitudinal zone settled solids including grit, means connected with such collecting means to travel therewith for removing said settled solids from said longitudinal zone, and means traveling with said collecting means for separating the grit from the solids and liquid removed from the chamber.

2. In a sedimentation system including a grit chamber, grit removing means traveling along said chamber and including means for collecting in a longitudinal zone settled solids including grit, means for removing such settled solids from said longitudinal zone, and means for cleaning the grit from the other solids and the liquid removed therewith and restoring such other solids and the liquid to the grit chamber.

3. In a sedimentation system including a grit chamber, the combination of grit removing mean travelling along said chamber and including means for removing from said chamber settled solids including grit, means for cleaning the grit and returning to the chamber the material separated from the grit, and a device for receiving the grit from such cleaning means; and means for discharging the grit from said device to a point at the outside of said chamber.

4. In a sedimentation system including a grit chamber, the combination of grit removing means travelling along said chamber and including means for removing from said chamber settled solids including grit, means for cleaning the grit and returning to the chamber the material separated from the grit, and a dumping device to receive the grit from said cleaning means; and means for operating said dumping device when the said reciprocable grit removing means reaches a predetermined point in its path.

5. In a sedimentation system including a grit chamber, rake means to convey the grit from the chamber floor, a grit and sludge collecting sump extending below the zone of rake action and into which the grit is raked, and suction means for withdrawing sludge from said sump including a suction nozzle immersed with the sludge in said sump and movable along said sump to withdraw a thickened mixture of grit and liquid therefrom, and means for separating the grit from the residual sludge.

6. For use in sedimentation, a sedimentation chamber, a rotary solids washer for separating gritty solids from sludge, means for conveying sludge settled in said chamber to be operated upon by said washer, and means for returning the non-gritty residue from said washer to said chamber.

7. For use in sedimentation, a sedimentation chamber, a rotary solids washer located outside of the limits of said chamber for separating gritty solids from sludge, means for conveying sludge settled in said chamber to be operated upon by said washer, and means for returning the non-gritty residue from said washer to said chamber.

8. For use in sedimentation, a sedimentation chamber, a solids washer located apart from said chamber for separating gritty solids from sludge, pump means for conveying sludge settled in said chamber to be operated upon by said washer, and means for returning the non-gritty residue from said washer to said chamber.

In testimony whereof I have affixed my signature to this specification.

SAMUEL I. BOUSMAN.